United States Patent
Wu

(10) Patent No.: US 11,207,951 B2
(45) Date of Patent: Dec. 28, 2021

(54) FRONT HEADER STRUCTURE AND A VEHICLE COMPRISING A FRONT HEADER STRUCTURE

(71) Applicant: Ningbo Geely Automobile Research & Development Co., Ltd., Ningbo (CN)

(72) Inventor: Biquan Wu, Gothenburg (SE)

(73) Assignee: NINGBO GEELY AUTOMOBILE RESEARCH & DEVELOPMENT CO., Ningbo (CN)

( * ) Notice: Subject to any disclaimer, the term of this patent is extended or adjusted under 35 U.S.C. 154(b) by 0 days.

(21) Appl. No.: 16/874,523

(22) Filed: May 14, 2020

(65) Prior Publication Data
US 2020/0269925 A1 Aug. 27, 2020

Related U.S. Application Data

(63) Continuation of application No. PCT/CN2018/106876, filed on Sep. 21, 2018.

(30) Foreign Application Priority Data

Nov. 21, 2017 (EP) .................................. 17202867

(51) Int. Cl.
*B62D 25/06* (2006.01)
*B60J 1/00* (2006.01)
(Continued)

(52) U.S. Cl.
CPC ............... *B60J 1/007* (2013.01); *B60J 7/00* (2013.01); *B62D 25/06* (2013.01); *B62D 27/02* (2013.01)

(58) Field of Classification Search
CPC ....... B60J 7/02; B60J 7/022; B60J 1/02; B60J 1/007
(Continued)

(56) References Cited

U.S. PATENT DOCUMENTS 3,833,254 A 9/1974 Renner
6,513,865 B1 * 2/2003 Lutz ...................... B60J 1/1884
296/213
(Continued)

FOREIGN PATENT DOCUMENTS

CN 202180858 U 4/2012
CN 202574387 U 12/2012
(Continued)

OTHER PUBLICATIONS

International Search Report and Written Opinion from corresponding International Patent Application No. PCT/CN2018/106876, dated Dec. 27, 2018, 10 pages.
(Continued)

*Primary Examiner* — Dennis H Pedder
(74) *Attorney, Agent, or Firm* — Tucker Ellis LLP

(57) ABSTRACT

A front header structure of a vehicle body has an elongated shape in a lateral direction of the vehicle body and is attached to side structures of the vehicle body. In a longitudinal direction, the front header structure is arranged between a front section of a sunroof opening and an upper section of a windshield opening. The front header structure includes an upper part attached to an lower part and a rear part, where the rear part forms a front frame section of a sunroof frame encompassing the sunroof opening. The lower, upper and rear parts each have a rear lower section, a front upper section and an intermediate step section arranged between the rear lower section and the front upper section. The front header structure includes a first compartment formed between the lower and upper parts and a second compartment formed between the upper and rear parts.

11 Claims, 6 Drawing Sheets

(51) Int. Cl.
  *B60J 7/00* (2006.01)
  *B62D 27/02* (2006.01)
(58) Field of Classification Search
  USPC ...... 296/96.21, 203.01–203.03, 201, 216.07, 296/216.08
  See application file for complete search history.

(56) References Cited

U.S. PATENT DOCUMENTS

| | | | |
|---|---|---|---|
| 8,613,467 B2* | 12/2013 | Tanaka | B62D 25/04 280/730.2 |
| 2009/0174229 A1* | 7/2009 | Ordonio | B62D 25/06 296/216.06 |
| 2009/0206635 A1* | 8/2009 | Nydam | B62D 25/06 296/210 |
| 2015/0115663 A1* | 4/2015 | Joyce | B62D 29/008 296/193.12 |
| 2016/0121702 A1* | 5/2016 | Bojanowski | B62D 65/026 29/426.2 |

FOREIGN PATENT DOCUMENTS

| | | |
|---|---|---|
| CN | 204895592 U | 12/2015 |
| CN | 205574068 U | 9/2016 |
| CN | 206067913 U | 4/2017 |
| DE | 102012008561 A1 | 10/2012 |
| DE | 102014013012 A1 | 3/2015 |
| DE | 102016001316 A1 | 8/2016 |
| EP | 1897786 A1 | 3/2008 |
| JP | 2015003701 A | 1/2015 |
| WO | 2013047547 A1 | 4/2013 |

OTHER PUBLICATIONS

Extended European Search Report from corresponding European Patent Application No. 17202867.2, dated Jun. 11, 2018, 7 pages.

* cited by examiner

FRONT HEADER STRUCTURE AND A VEHICLE COMPRISING A FRONT HEADER STRUCTURE

RELATED APPLICATION DATA

This application is a continuation of International Patent Application No. PCT/CN2018/106876, filed Sep. 21, 2018, which claims the benefit of European Patent Application No. 17202867.2, filed Nov. 21, 2017, the disclosures of which are incorporated herein by reference in their entireties.

TECHNICAL FIELD

The present disclosure relates to a front header structure of a vehicle body, where the front header structure is having an elongated shape extending essentially in a lateral direction of the vehicle body and attached to side structures of the vehicle body. The disclosure further relates to a vehicle having a front header structure.

BACKGROUND

Front header structures are used in vehicle body constructions as an integrated part providing strength and torsional stiffness to the vehicle body and roof structure of the vehicle. Front header structures are traditionally having an elongated shape extending essentially in a lateral direction of the vehicle body and the front header structure is attached to side structures of the vehicle body in order to form the integrated part of the vehicle body. In a longitudinal direction of the vehicle body, the front header structure is arranged between an upper section of a windshield opening and a front section of a roof opening for a roof panel construction.

The front header structure is an important part of the vehicle body construction that is ensuring integrity of the vehicle's passenger compartment in the event of a crash, while absorbing impact energy. Roof crush requirements are demanding stronger vehicle body constructions, and at the same time there is a demand for more lightweight vehicle body constructions. These requirements and demands can be hard to meet with modern vehicle designs, especially when the vehicles are equipped with top-loaded sunroof constructions. These sunroof constructions often provide a limited space for the front header structure, since the top-loaded sunroof stretches all over the roof area of the vehicle, including the front header structure 1, to give the desired functionality and aesthetic appearance of the sunroof and vehicle body design.

There is thus a need for an improved front header structure that provides sufficient strength to the vehicle body design, where the front header structure is lightweight in construction and also suitable for a top-loaded sunroof, which is limiting the space for the front header structure.

SUMMARY

An object of the present disclosure is to provide a front header structure and a vehicle comprising a front header structure where the previously mentioned structural and design requirements are met. This object is at least partly achieved by the features of the independent claims. The dependent claims contain further developments of the front header structure.

The disclosure concerns a front header structure of a vehicle body, where the front header structure is having an elongated shape extending essentially in a lateral direction of the vehicle body and attached to side structures of the vehicle body, and where the front header structure in a longitudinal direction of the vehicle body is arranged between a front section of a sunroof opening and an upper section of a windshield opening. The front header structure comprises a lower part, an upper part attached to the lower part, and a rear part attached to the upper part, where the rear part is forming a front frame section of a sunroof frame encompassing the sunroof opening. The lower part, the upper part and the rear part, each has a rear lower section, a front upper section and an intermediate step section arranged between the rear lower section and the front upper section, wherein the front header structure comprises a first compartment formed between the lower part and the upper part and a second compartment formed between the upper part and the rear part.

With these features, a front header structure with high strength and low weight is achieved through the shaping of the lower part, the upper part, and the rear part. Each part has a rear lower section, a front upper section and an intermediate step section arranged between the rear lower section and the front upper section, and when the parts are attached to each other the first compartment is formed between the lower part and the upper part and the second compartment is formed between the upper part and the rear part. The front header structure is an important part of the vehicle body construction, and is designed to absorb impact energy in the event of a crash. The front header structure design described above will ensure that roof crush requirements can be met, and at the same time providing a suitable front header structure for a top-loaded sunroof construction, which may limit the space for the front header structure. The front header structure is designed to resist bending, compressive loads and torsional loads in an efficient way. Through the rigid front header structure, low levels of noise, vibration and harshness (NVH) can be ensured in the vehicle body construction, which is improving the NVH performance of the construction. Further, the front header structure is providing a suitable attachment to the top-loaded sunroof.

According to an aspect of the disclosure, the first compartment is essentially delimited by the step section of the lower part, the rear lower section of the lower part, the step section of the upper part, and the front upper section of the upper part. The first compartment is formed between the lower part and the upper part, which parts are forming a base structure for the front header construction including the first compartment. This design with the first compartment formed between the lower part and the upper part is providing a strong and lightweight base structure being a structural part of the total front header construction. The base structure is extending in the longitudinal direction from the sunroof opening to the windshield opening and in the lateral direction between the side structures.

According to another aspect of the disclosure, the second compartment is essentially delimited by the step section of the upper part, the rear lower section of the upper part, the step section of the rear part, and the front upper section of the rear part. The design with the rear part and the second compartment is adding further strength to the front header construction so that roof crush requirements can be met. The forming of the two compartments is providing a lightweight and strong construction so that further reinforcement components are not needed, even if the top-loaded sunroof construction is limiting the space for the front header structure.

According to a further aspect of the disclosure, the extension of the first compartment in the longitudinal direction is larger than the extension of the second compartment in the longitudinal direction. Two compartments with different shapes and extensions in the longitudinal direction are in this way formed between the lower, upper and rear parts. This gives flexibility in the design of the sunroof frame, since the rear part may have a shorter extension in the longitudinal direction than the other parts, which also is giving a more lightweight and material-saving construction.

According to an aspect of the disclosure, each of the lower part, the upper part, and the rear part, is having an essentially step-like cross-sectional shape with a single-step configuration formed by the rear lower section, the front upper section and the intermediate step section. The step-like cross-sectional shape with a single-step configuration is providing strength to the front header construction.

According to another aspect of the disclosure, the intermediate step sections of the lower part, the upper part and the rear part, have essentially the same height. The height of the intermediate step sections can be chosen to meet specific constructional demands and may vary depending on the vehicle design. Since the step sections are having essentially the same height, the front header construction can be made with a compact design with parts that are easy to assemble.

According to an aspect of the disclosure, the lower part is extending in the longitudinal direction of the vehicle from the sunroof opening to the windshield opening, and wherein the upper part is arranged above the lower part and is extending in the longitudinal direction of the vehicle from the sunroof opening to the windshield opening. The first compartment can through this arrangement be formed between the lower part and the upper part, which parts are forming the base structure for the front header construction including the first compartment, as described above. This design is providing a strong and lightweight base structure being a structural part of the total front header construction.

According to another aspect of the disclosure, the rear part is arranged above the upper part and is extending in the longitudinal direction of the vehicle from the sunroof opening in a direction towards the windshield opening. This gives flexibility in the design of the sunroof frame, since the rear part may have a shorter extension in the longitudinal direction than the other parts, which also is giving a more lightweight and material-saving construction.

According to further aspects of the disclosure, a front edge of the rear part is arranged above and attached to the front upper section of the upper part, and the front edge can be attached to the front upper section of the upper part through laser welding. The laser welding is providing a simple and strong connection between the parts. Through the arrangement of the front edge of the rear part above and attached to the front upper section of the upper part, a material-saving and lightweight construction can be achieved. The laser welding is further providing an efficient way of fastening the parts, where also access welding holes in the front header structure can be avoided in order to improve the strength of the construction.

According to an aspect of the disclosure, the rear lower sections of the lower part, the upper part and the rear part, are attached to each other forming a sunroof flange adapted for holding a front section of a sunroof. The sunroof flange is providing an attachment section of the front header construction to which the sunroof construction can be attached in a simple and convenient way through for example gluing or through gluing in combination with screw fasteners.

According to another aspect of the disclosure, the front upper sections of the lower part and the upper part are attached to each other forming a windshield flange adapted for holding an upper section of a windshield. The windshield flange is providing an attachment section of the front header construction to which the windshield can be fastened in a simple and convenient way through for example gluing.

According to an aspect of the disclosure, the lower part, the upper part and the rear part, are each made of a separate piece of elongated sheet metal. The shaping of the lower part, the upper part and the rear part, can be achieved for example through press forming of the metal sheets.

The disclosure further concerns a vehicle comprising a front header structure with the features described above.

BRIEF DESCRIPTION OF DRAWINGS

The disclosure will be described in greater detail in the following, with reference to the attached drawings, in which.

DESCRIPTION OF EXAMPLE EMBODIMENTS

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1:
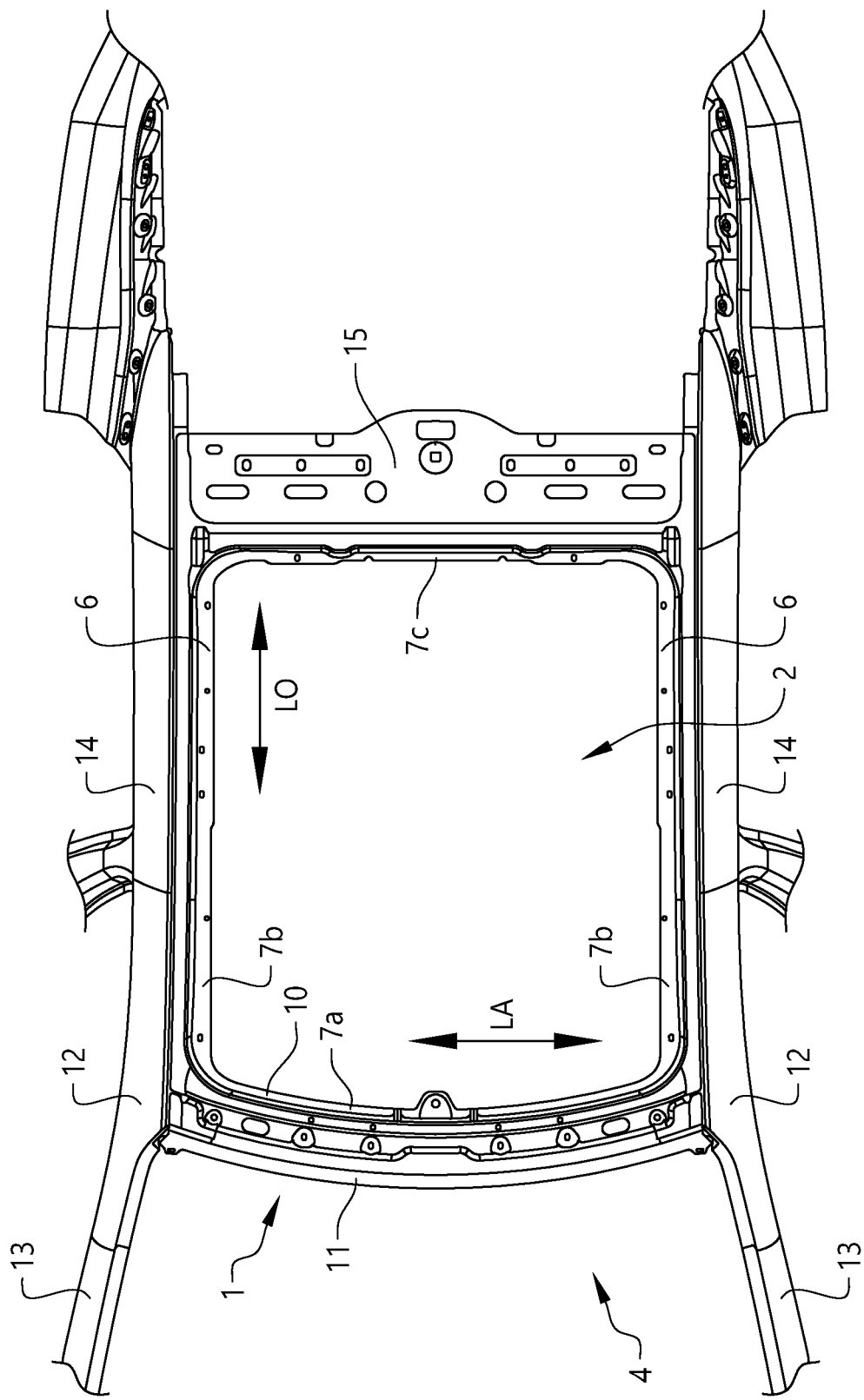
FIG. 1 shows schematically, in a view from above, a part of a vehicle body construction with a front header structure according to the disclosure.

FIG. 1 schematically shows, in a view from above, a part of a vehicle body construction with a front header structure 1. In the figures a car body construction and parts of a car body structure are shown. It should however be understood that the front header structure 1 disclosed also may be suitable for other types of vehicles. The vehicle body structure shown in the figures is a vehicle body frame structure, which is part of the vehicle's body in white (BIW) construction, where no moving parts, engine, chassis subassemblies, or trim have been added to or assembled in the frame structure.

Figure 2:
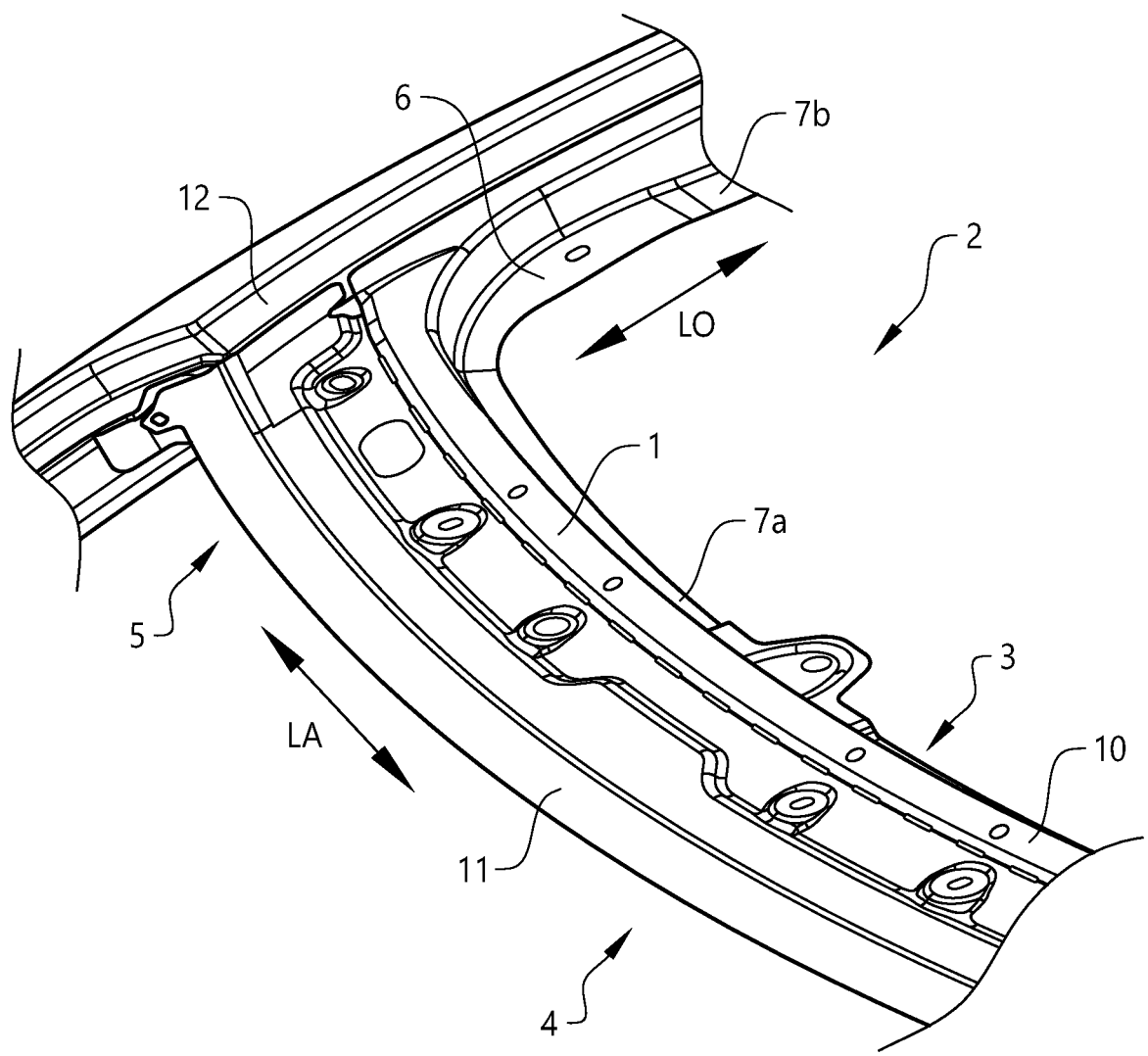
FIG. 2 shows schematically, in a perspective view from above, a part of a vehicle body construction with a front header structure according to the disclosure.
Figure 3:
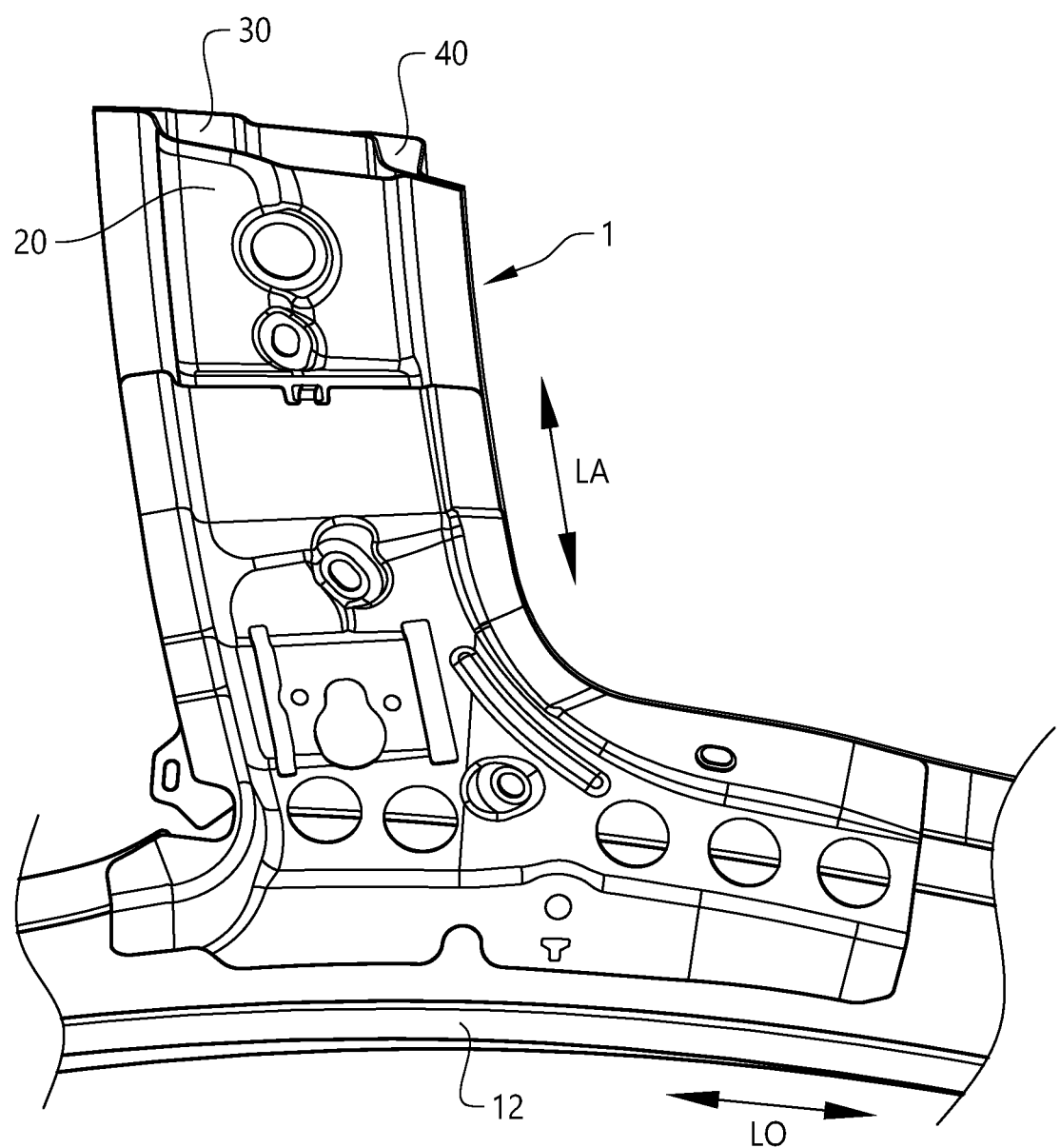
FIG. 3 shows schematically, in perspective view from below, a cross-section of a front header structure according to the disclosure.

As shown in FIGS. 1 and 2, the front header structure 1 is having an elongated shape, and the front header structure 1 is extending essentially in a lateral direction LA of the vehicle body. The front header structure 1 is attached to an upper front section of side structures 12 of the vehicle body through for example welding, gluing or other suitable fastening means. The side structures 12 may be provided with reinforcement parts or other structural components, such as front header brackets, to which the front header structure 1 is attached. The front section of the side structures 12 of the vehicle body may for example comprise upper parts of A-pillars 13 and front parts of roof rail structures 14 arranged on each side of the vehicle body. As shown in FIG. 1, the elongated shape of the front header structure in the lateral direction LA may in a known way be slightly curved, as shown in FIGS. 1 and 2, to match the shape of a windshield opening 4, into which a windshield can be attached through for example gluing.

In the longitudinal direction LO of the vehicle body, the front header structure 1 is arranged between a front section 3 of a sunroof opening 2 and an upper section 5 of a windshield opening 4, as best shown in FIG. 2. The sunroof opening 2 is arranged to receive a sunroof construction covering a part of, the whole, or essentially the whole roof construction of the vehicle. In the embodiment shown in FIG. 1, the sunroof opening 2 stretches over a major part of the roof section of the vehicle, and as shown in the embodiment in FIG. 1, the sunroof opening 2 has an essentially rectangular shape. In this way a large part of the roof construction of the vehicle can be provided with a top-loaded sunroof, which often is desired with modern vehicle sunroof constructions to provide an aesthetically appealing spacious interior design of the vehicle. The sunroof opening may also have other shapes than rectangular depending on the design of the vehicle. The constructional details of the top-loaded sunroof will not be further described. The top-loaded sunroof may be of any suitable construction and design.

The front header structure 1 is through its construction and connection to the side structures 12 an integrated part of the vehicle body construction that is providing strength and torsional stiffness to the vehicle body and roof structure of the vehicle. The front header structure 1 is an important part of the vehicle body construction that is ensuring integrity of the vehicle's passenger compartment in the event of a crash, through the absorption of impact energy together with other structural parts of the vehicle body. Roof crush requirements or standards are, as described above, demanding stronger vehicle body constructions. There is also a need for the front header structure 1 to be limited in space and lightweight in construction to secure that the front header structure 1 is suitable for the top-loaded sunroof structure and at the same time providing a lightweight vehicle body The front header structure 1 according to the disclosure is essentially built up from three elongated and shaped or profiled metal sheets that together are forming the elongated front header structure 1. When mounted on the vehicle body, the three metal sheets are forming the front header structure 1, which is extending essentially in the lateral direction LA between the side structures 12, as shown in FIG. 1. The profiled metal sheets are attached to each other in a way so that they are forming a strong and lightweight construction that is meeting the demands on a front header structure 1 suitable for a top-loaded sunroof, where a front part of the top-loaded sunroof may extend over the front header structure 1. The thickness of the metal sheets may vary depending on the construction of the front header structure, and as a non-limiting example the metal sheets may be steel sheets of a suitable quality with a thickness between 1-2 mm. The lower part, the upper part and the rear part may be manufactured from different types of steel sheets with different thicknesses if desired. Other suitable materials may also be used in the front header construction, such as for example aluminium or composite materials.

The front header structure 1 comprises a lower part 20, an upper part 30, and a rear part 40, where the three parts 20, 30, 40 are formed from elongated profiled metal sheets into a desired constructional shape. In this way, the lower part 20, the upper part 30 and the rear part 40, are each made of a separate piece of elongated sheet metal, which when attached to each other are forming the front header structure 1. The upper part 30 is attached to the lower part 20, and the rear part 40 is attached to the upper part 30, as shown in FIGS. 3-5B. The parts 20, 30, 40 can be attached to each other through for example welding, spot welding, laser welding, gluing or with other suitable fastening means known in the art. To provide strength and a lightweight construction to the front header structure, the lower part 20, the upper part 30 and the rear part 40, each has a step-shaped cross-sectional profile or an essentially step-like cross-sectional shape, with a single-step configuration, as shown in FIGS. 5A and 5B. Through the single-step configuration, the lower part 20, the upper part 30 and the rear part 40 can be attached to each other in a way so that a strong and lightweight construction that is limited in space is achieved. It should be noted that the lower part 20, the upper part 30 and the rear part 40 may be provided with other profiled sections than the single-step configuration, as shown in the figures, such as for example grooves, indentations, protrusions, apertures or other reinforcement and constructional structures. However, these profiled sections have smaller extensions or dimensions compared to the single-step configuration of the lower part 20, the upper part 30 and the rear part 40.

With a step-shaped cross-sectional profile or an essentially step-like cross-sectional shape, having a single-step configuration is meant a cross-sectional shape or structure that is formed by two sections on different levels with an intermediate section that is connecting the two sections on different levels. In this way the cross-sectional shape is forming a single step between a first level and a second level arranged at different heights in relation to each other, as will be further understood in relation to the embodiments described below.

As shown in FIGS. 3-5B, the lower part 20, comprises a rear lower section 21, a front upper section 23, and an intermediate step section 22 arranged between the rear lower section 21 and the front upper section 23. The sections 21, 22, 23 of the lower part 20 are forming the essentially step-like cross-sectional shape with the single-step configuration of the lower part 20. As shown in the embodiment in FIGS. 3-5B, the rear lower section 21 has a longer extension in the longitudinal direction LO compared to the front upper section 23. Depending on the design of the front header structure, the extension of the rear lower section 21, the step section 22, and the front upper section 23 of the lower part 20 in the longitudinal direction LO may be varied in order to achieve a desired construction. Also, the extension of the rear lower section 21, the step section 22, and the front upper section 23 in the longitudinal direction LO may vary in different parts of the lower part 20 over the extension of the front header structure in the lateral direction LA.

The step section 22 of the lower part 20 is forming an intermediate integrated bridging section 24 between the rear lower section 21 and the front upper section 23, and the shaping of the lower part 20 can be achieved for example through press forming of the metal sheet constituting the lower part 20. The extension of the bridging section 24 between the rear lower section 21 and the front upper section 23 can be varied depending on the design of the step section 22, and the angle of the step section 22 in relation to the lower section 21 and the upper section 23. The cross-sectional shape of the step section 22 can be slightly curved as shown in FIGS. 3-5B in order to bridge the rear lower section 21 and the front upper section 23, and in the embodiment shown, the extension of the bridging section 24 in the longitudinal direction LO is smaller than the extension of the rear lower section 21 and the front upper section 23. Through the step section 22, the front upper section 23 is arranged at a height H above the rear lower section 21. The height H of the step section 22 may be varied depending on the design of the front header structure 1.

As shown in FIGS. 3-5B, the rear lower section 21 of the lower part 20 may have a slightly curved or non-linear cross-sectional shape to meet specific construction demands. The rear lower section 21 of the lower part 20 may for example be provided with small reinforcement steps, elevations, or undulations as shown in FIG. 5B. In an alternative embodiment, the cross-sectional shape of the rear lower section 21 may instead be essentially planar or linear. In the same way, the cross-sectional shape of the front upper section 23 of the lower part 20 may be slightly curved or non-linear, or alternatively essentially planar or linear. In the embodiment shown in FIGS. 3-5B, the front upper section 23 has an essentially linear cross-sectional shape. It should be noted that the cross-sectional shapes of the rear lower section 21, the step section 22 and the front upper section 23 may vary in different parts of the lower part 20 over the extension of the front header structure 1 in the lateral direction LA.

As further shown in FIGS. 3-5B, the upper part 30 is attached to the lower part 20. The upper part 30 comprises a rear lower section 31, a front upper section 33, and an intermediate step section 32 arranged between the rear lower section 31 and the front upper section 33. The sections 31, 32, 33 of the upper part 30 are forming the essentially step-like cross-sectional shape with the single-step configuration of the upper part 30. As shown in the embodiment in FIGS. 3-5B, the rear lower section 31 has a shorter extension in the longitudinal direction LO compared to the front upper section 33. Depending on the design of the front header structure, the extension of the rear lower section 31, the step section 32, and the front upper section 33 of the upper part 30 in the longitudinal direction LO may be varied in order to achieve the desired construction. Also, the extension of the rear lower section 31, the step section 32, and the front upper section 33 in the longitudinal direction LO may vary in different parts of the upper part 30 over the extension of the front header structure 1 in the lateral direction LA.

The step section 32 of the upper part 30 is forming an intermediate integrated bridging section 34 between the rear lower section 31 and the front upper section 33, and the shaping of the upper part 30 can be achieved for example through press forming of the metal sheet constituting the upper part 30. The extension of the bridging section 34 between the rear lower section 31 and the front upper section 33 can be varied depending on the design of the step section 32, and the angle of the step section 32 in relation to the lower section 31 and the upper section 33. The cross-sectional shape of the step section 32 can be slightly curved as shown in FIGS. 3-5B in order to bridge the rear lower section 31 and the front upper section 33, and in the embodiment shown, the extension of the bridging section 34 in the longitudinal direction LO is smaller than the extension of the rear lower section 31 and the front upper section 33. Through the step section 32, the front upper section 33 is arranged at a height H above the rear lower section 31. The height H of the step section 32 may be varied depending on the design of the front header structure 1. As shown in FIGS. 3-5B the height H of the step section 32 is the same or essentially the same as the height H of the step section 22 of the lower part 20, wherein a rigid construction of the front header structure 1 is achieved.

As shown in FIGS. 3-5B, the front upper section 33 of the upper part 30 may have a slightly curved or non-linear cross-sectional shape to meet specific construction demands. The front upper section 33 of the upper part 30 may for example be provided with small reinforcement steps, elevations, or undulations as shown in FIG. 5B. In an alternative embodiment, the cross-sectional shape of the front upper section 33 may instead be essentially planar or linear. In the same way, the cross-sectional shape of the rear lower section 31 of the upper part 30 may be slightly curved or non-linear, or alternatively essentially planar or linear. In the embodiment shown in FIGS. 3-5B, the rear lower section 31 has an essentially linear cross-sectional shape. It should be noted that the cross-sectional shapes of the rear lower section 31, the step section 32 and the front upper section 33 may vary in different parts of the upper part 30 over the extension of the front header structure in the lateral direction LA.

The rear part 40 of the front header structure is shown in FIGS. 3-5B, and the rear part 40 is attached to the upper part 30. The rear part 40 comprises a rear lower section 41, a front upper section 43 and an intermediate step section 42 arranged between the rear lower section 41 and the front upper section 43. The sections 41, 42, 43 of the rear part 40 are forming the essentially step-like cross-sectional shape with the single-step configuration of the rear part 40. As shown in the embodiment in FIGS. 3-5B, the rear lower section 41 has a slightly shorter extension in the longitudinal direction LO compared to the front upper section 43. Depending on the design of the front header structure, the extension of the rear lower section 41, the step section 42, and the front upper section 43 of the rear part 40 in the longitudinal direction LO may be varied in order to achieve a desired construction. Also, the extension of the rear lower section 41, the step section 42, and the front upper section 43 in the longitudinal direction LO may vary in different parts of the rear part 40 over the extension of the front header structure 1 in the lateral direction LA.

The step section 42 of the rear part 40 is forming an intermediate integrated bridging section 44 between the rear lower section 41 and the front upper section 43, and the shaping of the rear part 40 can be achieved for example through press forming of the metal sheet constituting the rear part 40. The extension of the bridging section 44 between the rear lower section 41 and the front upper section 43 can be varied depending on the design of the step section 42, and the angle of the step section 42 in relation to the lower section 41 and the upper section 43. The cross-sectional shape of the step section 42 can be slightly curved as shown in FIGS. 3-5B in order to bridge the rear lower section 41 and the front upper section 43, and in the embodiment shown, the extension of the bridging section 44 in the longitudinal direction LO is smaller than the extension of the rear lower section 41 and the front upper section 43. Through the step section 42, the front upper section 43 is arranged at a height H above the rear lower section 41. The height H of the step section 42 may be varied depending on the design of the front header structure 1. As shown in FIGS. 3-5B the height H of the step section 42 is the same or essentially the same as the height H of the step section 22 of the lower part 20 and the step section 32 of the upper part 30, further contributing to the rigid construction of the front header structure 1.

As shown in FIGS. 3-5B, the rear lower section 41 of the rear part 40 may have an essentially planar or linear cross-sectional shape to meet specific construction demands. In an alternative embodiment, the cross-sectional shape of the rear lower section 41 may instead be slightly curved or non-linear. In the same way, the cross-sectional shape of the front upper section 43 of the rear part 40 may be slightly curved or non-linear, or alternatively essentially planar or linear. In the embodiment shown in FIGS. 3-5B, the front upper section 43 has an essentially linear cross-sectional shape. It should be noted that the cross-sectional shapes of the rear lower section 41, the step section 42 and the front upper section 43 may vary in different parts of the rear part 40 over the extension of the front header structure in the lateral direction LA.

As described above, through the construction of the front header structure 1, the lower part 20, the upper part 30 and the rear part 40, each has a rear lower section 21, 31, 41, a front upper section 23, 33, 43 and an intermediate step section 22, 32, 42 arranged between the rear lower section 21, 31, 41 and the front upper section 23, 33, 43. Thus, each of the lower part 20, the upper part 30, and the rear part 40, is having an essentially step-like cross-sectional shape with a single-step configuration formed by the rear lower section 21, 31, 41, the front upper section 23, 33, 43 and the intermediate step section 22, 32, 42. The intermediate step sections 22, 32, 42 of the lower part 20, the upper part 30 and the rear part 40 respectively, have as described above essentially the same height H.

Figure 4:
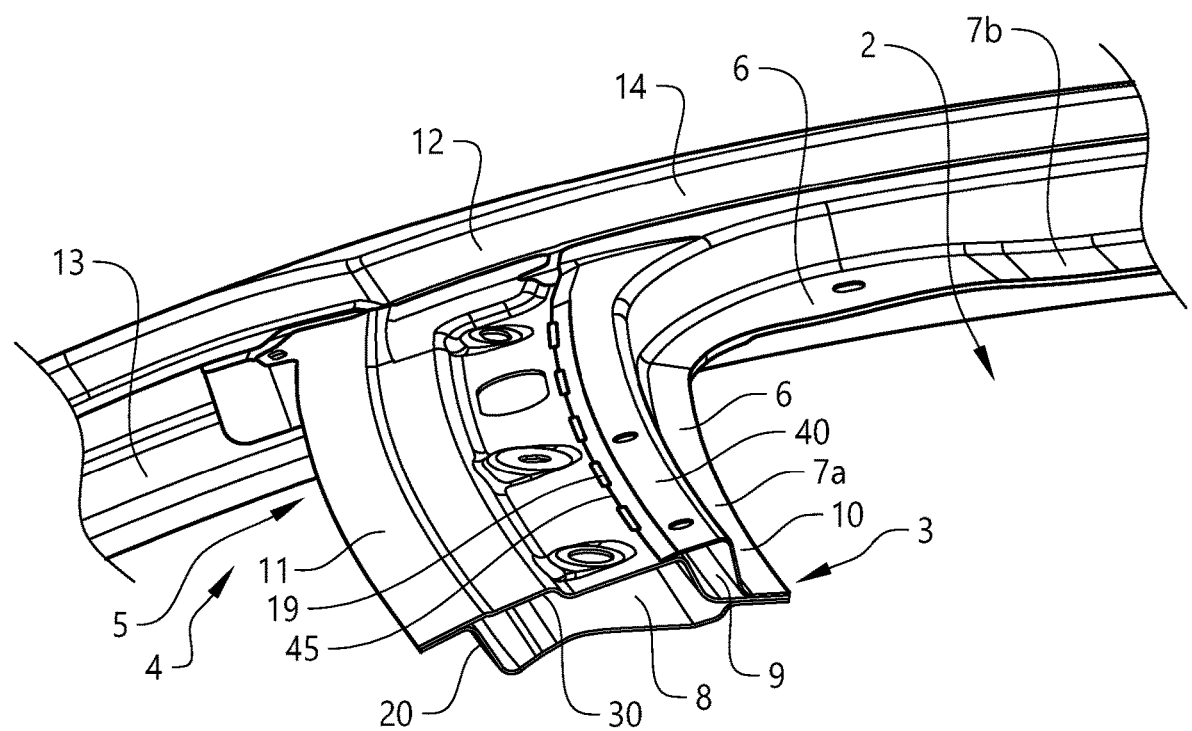
FIG. 4 shows schematically, a cross-section of a front header structure according to the disclosure.
Figure 5A:
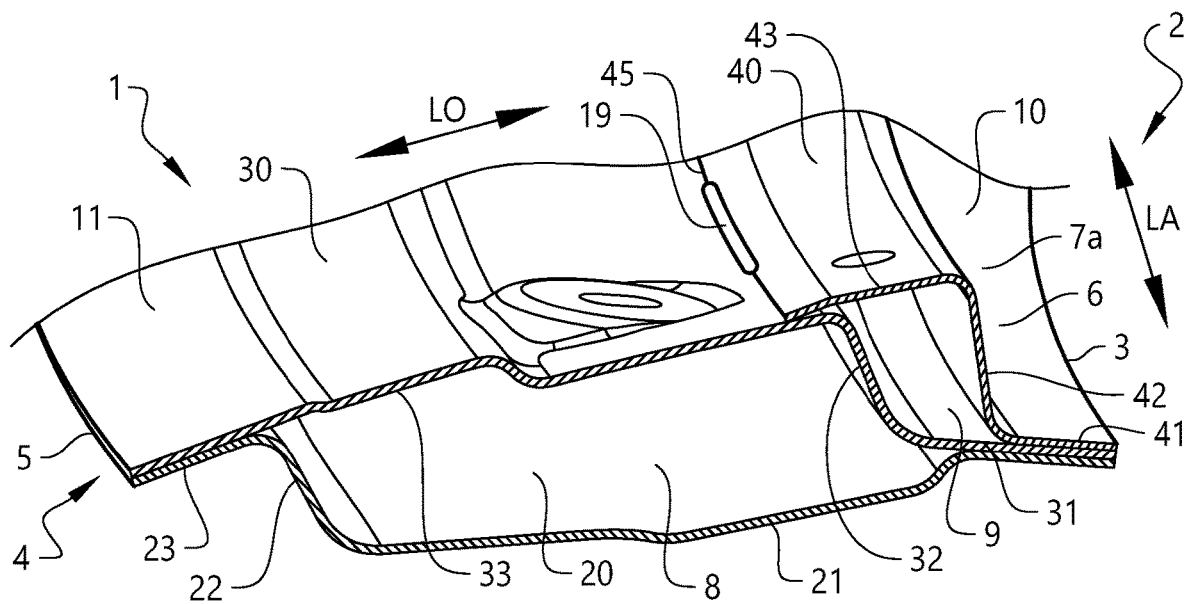
FIG. 5A-B show schematically, cross-sections of a front header structure according to the disclosure.
Figure 5B:
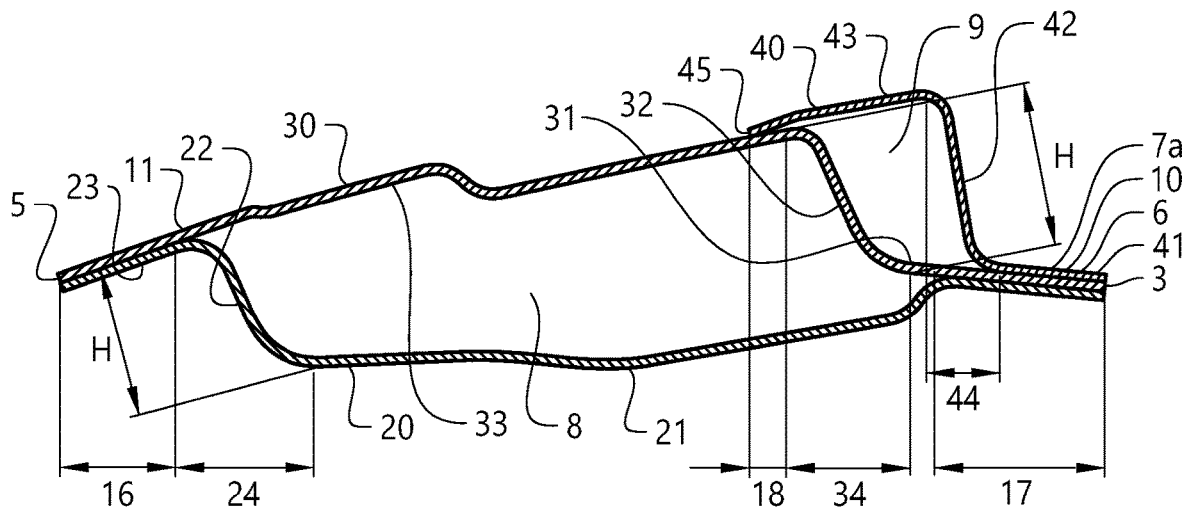

As shown in FIGS. 1, 2 and 4, the rear part 40 of the front header structure is forming a front frame section 7$a$ of a sunroof frame 6 encompassing the sunroof opening 2. The sunroof frame 6 is a constructional part of the vehicle body construction forming a frame structure for the top-loaded sunroof. The top-loaded sunroof may for example be glued and screwed to the sunroof frame 6 to achieve a watertight and secure attachment of the sunroof to the vehicle body. The sunroof frame 6 is delimiting the sunroof opening 2, as shown in FIG. 1, and has an essentially rectangular shape defined by the front frame section 7$a$, two side frame sections 7$b$ arranged along the side structures 12 of the vehicle body, and a rear frame section 7$c$ arranged in a rear part of the vehicle body in relation to a rear header structure 15. As shown in FIG. 1, the front frame section 7$a$ and the rear frame section 7$c$ are extending essentially in the lateral direction LA, and the two side frame sections 7$b$ are extending essentially in the longitudinal direction LO. In this way the two side frame sections 7$b$ are connecting the front frame section 7$a$ and the rear frame section 7$c$, forming the sunroof frame 6 with an essentially rectangular shape. In alternative embodiments, the sunroof frame may have other shapes than essentially rectangular depending on the vehicle body design or the design of the top-loaded sunroof.

The sunroof frame 6 may be arranged as a separate element that is integrated into the vehicle body construction and attached to other parts of the vehicle body through for example welding or gluing. The front frame section 7$a$ is together with the side frame sections 7$b$ and the rear frame section forming the sunroof frame and the sunroof frame 6 may be manufactured from one or more pieces of shaped metal sheets. The shaping of the piece or pieces forming the sunroof frame 6 can be achieved for example through press forming of the one or more metal sheets.

As described above, the rear part 40 is forming the front frame section 7$a$ of the sunroof frame 6. The side frame sections 7$b$ and the rear frame section 7$c$ of the sunroof frame 6 may have a cross-sectional shape with a single-step configuration similar to the shape of the rear part 40, to achieve a suitable arrangement for attaching the top-loaded sunroof to the sunroof frame. Since the rear part 40 is forming the front frame section 7$a$ of the sunroof frame, the combined front header and sunroof frame structure can be made more rigid and lightweight compared to traditional structures used, wherein the front header structure is composed of the three step-shaped lower, upper, and rear parts 20, 30, 40.

As shown in for example in FIGS. 4-5B, the front header structure 1 comprises a first compartment 8 formed between the lower part 20 and the upper part 30 and a second compartment 9 formed between the upper part 30 and the rear part 40. The first compartment 8 is essentially delimited by the step section 22 and the rear lower section 21 of the lower part 20, and by the step section 32 and the front upper section 33 of the upper part 30. The second compartment 9 is essentially delimited by the step section 32 and the rear lower section 31 of the upper part 30, and by the step section 42 and the front upper section 43 of the rear part 40.

Through the forming of the first compartment 8 and the second compartment 9 in the way described above, a strong front header construction with a hollow configuration providing low weight is achieved. The compartments 8, 9 may extend along the whole or essentially the whole front header structure 1 in the lateral direction LA between the side structures 12 of the vehicle body. Since the lower part 20 is firmly attached or fastened to the upper part 30, and the rear part 40 is firmly attached or fastened to the upper part 30, the two-compartment beam-like front header structure 1 is formed through the cross-sectional single-step configuration of the lower part 20, the upper part 30, and the rear part 40, as shown in FIGS. 5A and 5B. The structural configuration with the lower part 20, the upper part 30, and the rear part 40 together with the first compartment 8 and the second compartment 9 are forming a lightweight front header structure 1 that resists bending, compressive loads and torsional loads in an efficient way. The integration of the sunroof frame 6 in the front header structure 1 through the front frame section 7$a$ forming the rear part 40, is efficiently contributing to the strong and lightweight construction in order to meet the crush requirements that are demanding stronger vehicle body constructions.

As further can be seen in the disclosed embodiment in for example FIG. 5B, the extension of the first compartment 8 in the longitudinal direction LO is larger than the extension of the second compartment 9 in the longitudinal direction LO. The relationship between the extensions of the two compartments 8, 9 in the longitudinal direction of may vary depending on the design of the front header structure 1. It may also be possible in alternative embodiments that the extension of the first compartment 8 in the longitudinal direction LO is essentially the same as extension of the second compartment 9 in the longitudinal direction LO, or that the extension of the first compartment 8 in the longitudinal direction LO is smaller than the extension of the second compartment 9 in the longitudinal direction LO.

The lower part 20 and the upper part 30 are when being fastened to each other forming a base structure for the front header structure 1 including the first compartment 8. The base structure formed by the lower part 20 and the upper part 30 is in the embodiment shown in the figures extending in the longitudinal direction LO from the sunroof opening 2 to the windshield opening 4. Thus, the lower part 20 is extending in the longitudinal direction LO of the vehicle from the sunroof opening 2 to the windshield opening 4, and the upper part 30 is arranged above the lower part 20 and is extending in the longitudinal direction LO of the vehicle from the sunroof opening 2 to the windshield opening 4.

The front upper section 23 of the lower part 20 is, as shown in FIG. 5B, attached in an overlapping manner to the front part of the front upper section 33 of the upper part 30, and in this way a front overlapping section 16 is formed. The overlapping design of the front upper sections 23, 33 of the lower part 20 and the upper part 30 is contributing to the strength of the front header structure 1, and the length of the front overlapping section 16 in the longitudinal direction LO is essentially the same as the length of the front upper section 23 of the lower part 20. This length of the front overlapping section 16 in the longitudinal direction LO may be varied depending on the design and the constructional demands of the front header structure 1. Further, as an alternative, the front overlapping section 16 may be shorter than essentially the whole length of the front upper section 23 of the lower part 20, which may be accomplished through profiling of any or both of the upper section 23 of the lower part and the upper section 33 of the upper part 30 into a desired suitable shape. This may also be accomplished through designing the front upper section 23 of the lower part 20 or the front upper section 33 of the upper part 30 so that it is not extending all the way to the windshield opening 4.

The rear part of the rear lower section 21 of the lower part 20 is, as shown in FIG. 5B, attached in an overlapping manner to the rear lower section 31 of the upper part 30, and in this way a rear overlapping section 17 is formed. The overlapping design of the rear lower sections 21, 31 of the lower part 20 and the upper part 30 is contributing to the strength of the front header structure 1, and the length of the rear overlapping section 17 in the longitudinal direction LO may be varied depending on the design and the constructional demands of the front header structure 1. In the embodiment shown in FIG. 5B, the length of the rear overlapping section 17 in the longitudinal direction LO is somewhat shorter than the length of the rear lower section 31 of the upper part 30. The rear lower section 21 of the lower part 20 or the rear lower section 31 of the upper part 30 may also as an alternative be designed so that it is not extending all the way to the sunroof opening 2. Further, as another alternative the rear overlapping section 17 may be essentially the same as the whole length of the rear lower section 31 of the upper part 30.

Figure 6:
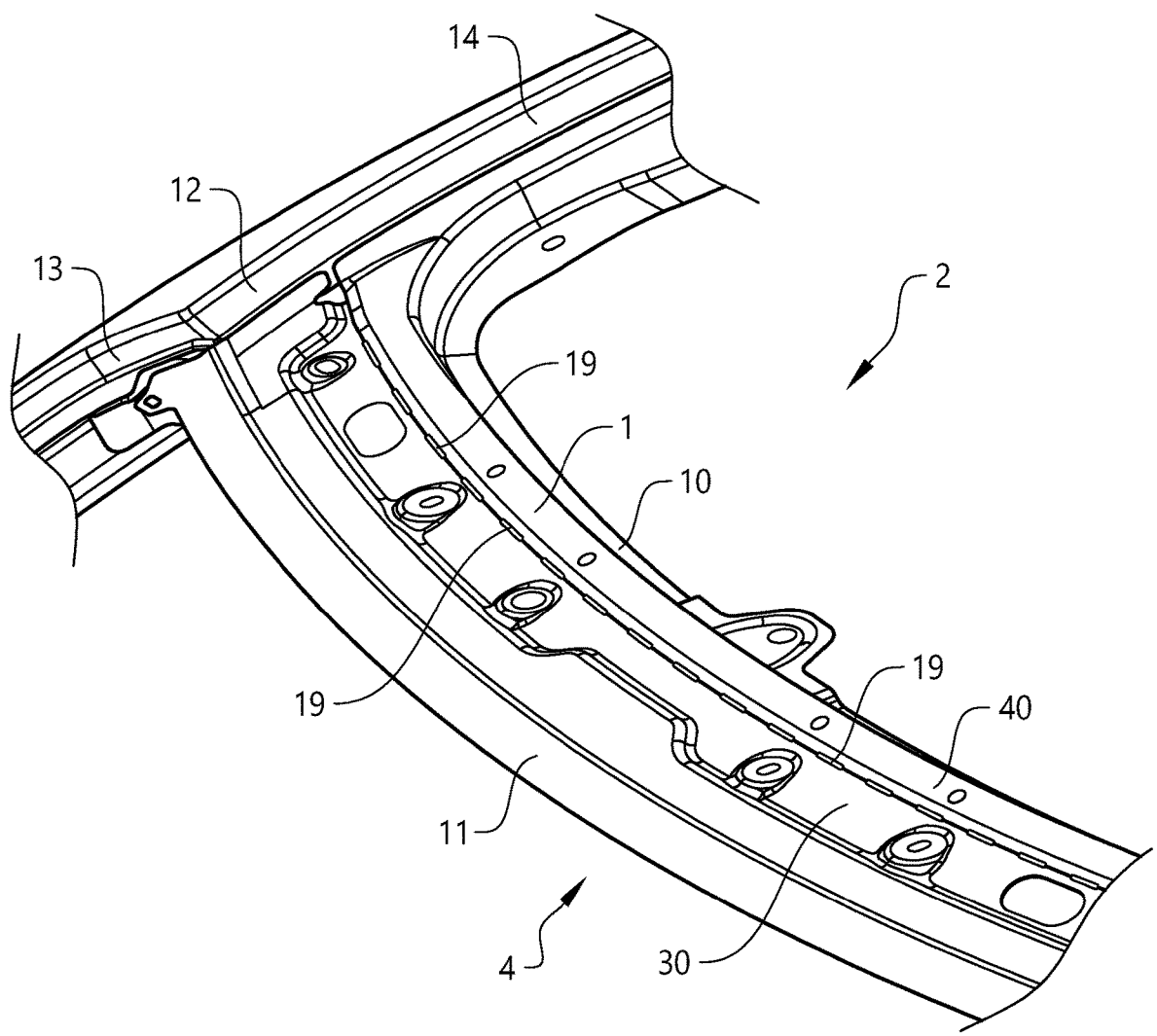
FIG. 6 shows schematically, in a perspective view from above, a part of a front header structure according to the disclosure.

As shown in for example FIG. 5B, the rear part 40 is arranged above the upper part 30, and the rear part 40 is extending in the longitudinal direction LO of the vehicle from the sunroof opening 2 in a direction towards the windshield opening. As shown in FIG. 5B, the rear part 40 is not extending all the way to the windshield opening 4 in the longitudinal direction LO. The front upper section 43 of the rear part 40 has a front edge 45. The front edge 45 is arranged so that it is positioned above the front upper section 33 of the upper part 30 when the rear part is attached or fastened to the upper part 30. A front part of the front upper section 43 of the rear part 40 is overlapping a rear part of the front upper section 33 of the upper part 30 so that an intermediate overlapping section 18 is formed. In the embodiment shown in the figures, the intermediate overlapping section 18 is arranged in the longitudinal direction LO between the front overlapping section 16 and the rear overlapping section 17. The extension of the intermediate overlapping section 18 in the longitudinal direction LO may be varied depending on the design and the construction of the front header structure 1. In the embodiment shown in the figures, only a small part of the front upper section 33 of the front part 30 is overlapping the front upper section 43 of the rear part 40. The overlapping sections of the upper part 30 and the rear part 40 in the intermediate overlapping section 18 may be in direct contact with each other throughout the extension in the longitudinal direction LO if desired. Alternatively, only the front edge 45 of the rear part 40 may be in direct contact with the upper section 33 of the upper part 30 and laser welded to the upper section 33. A weld 19 is then attaching the front edge 45 to the upper section 33 of the upper part 30. The weld 19 may in the different embodiments of the intermediate overlapping section extend as a continuous weld along essentially the whole length of the front header structure 1 in the lateral direction LA. As an alternative, the laser welding may be made intermittently over the length of the front header structure 1 in the lateral direction LA, so that a number of welds 19 are attaching the front edge 45 to the upper section 33 of the upper part 30, as shown for example in FIG. 6.

The rear lower section 41 of the rear part 40 is as shown in the figures attached or fastened to the rear lower section 31 of the upper part 30 in an overlapping manner within the rear overlapping section 17 described above. The length of the overlap between the rear lower section 41 of the rear part 40 and the rear lower section 31 of the upper part 30 in the longitudinal direction LO may be varied depending on the design and the constructional demands of the front header structure 1. The overlapping design of the rear lower sections 31, 41 of the upper part 30 and the rear part 40 is contributing to the strength of the front header structure 1. In the embodiment shown in FIG. 5B, the length of the overlap between the rear lower section 41 of the rear part 40 and the rear lower section 31 of the upper part 30 in the longitudinal direction LO within the rear overlapping section 17 is somewhat shorter than the length of the rear overlapping section 17. Further, as an alternative the overlap between the rear lower section 41 of the rear part 40 and the rear lower section 31 of the upper part 30 in the longitudinal direction LO may be the same or essentially the same as length of the rear overlapping section 17.

When forming the front header structure 1, the front edge 45 of the rear part 40 may be attached to the front upper section 33 of the upper part 30, for example through laser welding. In this way, when the lower part 20 and the upper part 30 forming the base structure for the front header structure 1 have been attached to the side structures 12 of the vehicle body, the sunroof frame 6 may be attached to the vehicle body structure and laser welded to achieve a strong construction. The front frame section 7a of the sunroof frame 6 forming the upper part 40 is thus attached to the upper part 30 so that the full front header structure is formed. The rear lower section 41 of the rear part 40 may be attached to the rear lower section 31 of the upper part 30 through for example welding or laser welding, or through other suitable fastening methods.

As shown in FIG. 5B, when the rear lower sections 21, 31, 41 of the lower part 20, the upper part 30, and the rear part 40 are attached to each other, they are within the rear overlapping section 17 forming a sunroof flange 10 adapted for holding a front section of a top-loaded sunroof construction. In a similar way, when the front upper sections 21, 31 of the lower part 20 and the upper part 30 are attached to each other, they are in the front overlapping section forming a windshield flange 11 adapted for holding an upper section of a windshield which is mounted in relation to the windshield opening 4.

As described above, the rear part 40 is arranged above the upper part 30, and the rear part 40 is extending in the longitudinal direction LO of the vehicle from the sunroof opening 2 in a direction towards the windshield opening. As shown in for example FIG. 5B, the rear part 40 is not extending all the way to the windshield opening 4 in the longitudinal direction LO. In an alternative embodiment, the rear part 40 may be designed to extend from the sunroof opening 2 to the windshield opening 4.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1: Front header structure
2: Sunroof opening
3: Front section
4: Windshield opening
5: Upper section
6: Sunroof frame
7a: Front frame section
7b: Side frame section
7c: Rear frame section
8: First compartment
9: Second compartment
10: Sunroof flange
11: Windshield flange
12: Side structures
13: A-pillar
14: roof rail structures
15: Rear header structure
16: Front overlapping section
17: Rear overlapping section
18: Intermediate overlapping section
19: Weld
20: Lower part
21: Rear lower section, lower part
22: Step section, lower part
23: Front upper section, lower part
24: Bridging section, lower part
30: Upper part
31: Rear lower section, upper part
32: Step section, upper part
33: Front upper section, upper part
34: Bridging section, upper part
40: Rear part
41: Rear lower section, rear part
42: Step section, rear part
43: Front upper section, rear part
44: Bridging section, rear part
45: Front edge, rear part

The invention claimed is:

1. A front header structure of a vehicle body, where the front header structure has an elongated shape extending along a lateral direction of the vehicle body and the front header structure is attached to side structures of the vehicle body, and where the front header structure in a longitudinal direction of the vehicle body is arranged between a front section of a sunroof opening and an upper section of a windshield opening, the front header structure comprising:
a lower part,
an upper part attached to the lower part, and
a rear part attached to the upper part,
wherein the rear part forms a front frame section of a sunroof frame encompassing the sunroof opening,
wherein the lower part, the upper part and the rear part each have a rear lower section, a front upper section and an intermediate step section, the intermediate step section bridging together the corresponding rear lower section and the corresponding front upper section,
wherein the front header structure further comprises a first compartment formed between the lower part and the upper part and a second compartment formed between the upper part and the rear part,
wherein the rear lower sections of the lower part, the upper part and the rear part are attached to each other and form a sunroof flange located at the front section of the sunroof opening to hold a front section of a sunroof of the vehicle, and
wherein the lower part extends in the longitudinal direction of the vehicle from the sunroof opening to the windshield opening, and wherein the upper part is located above the lower part and extends in the longitudinal direction of the vehicle from the sunroof opening to the windshield opening.

2. The front header structure according to claim 1, wherein the first compartment is formed by the intermediate step section of the lower part, the rear lower section of the lower part, the intermediate step section of the upper part, and the front upper section of the upper part.

3. The front header structure according to claim 1, wherein the second compartment is formed by the intermediate step section of the upper part, the rear lower section of the upper part, the intermediate step section of the rear part, and the front upper section of the rear part.

4. The front header structure according to claim 1, wherein a longitudinal extent of the first compartment in the longitudinal direction is larger than a longitudinal extent of the second compartment in the longitudinal direction.

5. The front header structure according to claim 1, wherein the rear lower section, the front upper section and the intermediate step section of each of the lower part, the upper part and the rear part are located relative one another so that each of the lower part, the upper part and the rear part have a step-like cross-sectional shape.

6. The front header structure according to claim 1, wherein the rear part is arranged above the upper part and extends in the longitudinal direction of the vehicle from the sunroof opening in a direction towards the windshield opening.

7. The front header structure according to claim 6, wherein a front edge of the rear part is located above and attached to the front upper section of the upper part.

8. The front header structure according to claim 7, wherein the front edge is attached to the front upper section of the upper part by a laser weld.

9. The front header structure according to claim 1, wherein the front upper sections of the lower part and the upper part are attached to each other and form a windshield flange located at the upper section of the windshield opening to hold an upper section of a windshield of the vehicle.

10. The front header structure according to claim 1, wherein the lower part, the upper part and the rear part, are each made of a separate piece of elongated sheet metal.

11. A vehicle comprising the front header structure according to claim 1.

* * * * *